United States Patent
Cox et al.

(10) Patent No.: US 7,891,609 B2
(45) Date of Patent: Feb. 22, 2011

(54) TURNAROUND METHODS

(75) Inventors: Isaiah Watas Cox, Baltimore, MD (US); Joseph Jeremiah Cox, East St Kilda (AU); Todd Tripp, Fort St. John (CA)

(73) Assignee: Borealis Technical Limited (GI)

( * ) Notice: Subject to any disclaimer, the term of this patent is extended or adjusted under 35 U.S.C. 154(b) by 608 days.

(21) Appl. No.: 11/897,845

(22) Filed: Aug. 29, 2007

(65) Prior Publication Data

US 2008/0059053 A1    Mar. 6, 2008

Related U.S. Application Data

(60) Provisional application No. 60/961,940, filed on Jul. 24, 2007.

(30) Foreign Application Priority Data

Aug. 29, 2006    (GB)    ................... 0616983.3

(51) Int. Cl.
*G06F 19/00*    (2006.01)
(52) U.S. Cl. .................. 244/121; 244/50; 244/100 R
(58) Field of Classification Search ................ 701/121; 244/50, 100 R
See application file for complete search history.

(56) References Cited

U.S. PATENT DOCUMENTS

| 2,320,547 | A | 6/1943 | Tiger |
|---|---|---|---|
| 2,460,387 | A | 2/1949 | Hunter |
| 2,631,476 | A | 3/1953 | Ravigneaux |
| 2,687,857 | A | 8/1954 | Caldwell et al. |
| 3,088,699 | A | 5/1963 | Larson |
| 3,109,324 | A | 11/1963 | Locher |
| 3,711,043 | A | 1/1973 | Cameron-Johnson |
| 3,764,094 | A | 10/1973 | Cross |
| 3,807,664 | A * | 4/1974 | Kelly et al. ................... 244/50 |
| 3,850,389 | A | 11/1974 | Dixon |
| 3,874,618 | A | 4/1975 | Bates |
| 3,977,631 | A | 8/1976 | Jenny |
| 4,659,039 | A | 4/1987 | Valdes |
| 5,078,340 | A | 1/1992 | Anderberg |
| 5,086,994 | A | 2/1992 | Donnelly et al. |

(Continued)

FOREIGN PATENT DOCUMENTS

EP    0756556 B1    9/1999

(Continued)

*Primary Examiner*—Mark Hellner

(57) ABSTRACT

A method for reducing the turnaround time of an aircraft having at least one self-propelled undercarriage wheel comprising the step of: moving the aircraft to a required location using at least one self-propelled undercarriage wheel; wherein thrust equipment, (e.g. turbines) are turned on only when needed for takeoff or prior to landing, and are turned off until takeoff or after landing; whereby departing equipment, arriving equipment, and turnaround equipment are not at risk from operating thrust equipment, (e.g. turbines). An apparatus for reducing the turnaround time of an aircraft is disclosed comprising a control unit for facilitating voice communication between a pilot and ground staff. Said control unit may further comprise a control arm for inputting the required direction of movement of said nosewheel; means for transmitting direction information to said self-propelled nosewheel; means for receiving direction information at said self-propelled nosewheel; and means for controlling the direction of said nosewheel. The control unit may also comprise means for turning on and off an APU, parking brakes, and other aircraft features.

21 Claims, 2 Drawing Sheets

U.S. PATENT DOCUMENTS

| | | |
|---|---|---|
| 5,104,063 A | 4/1992 | Hartley |
| 5,875,994 A | 3/1999 | McCrory |
| 6,411,890 B1 | 6/2002 | Zimmerman |
| 6,657,334 B1 | 12/2003 | Edelson |
| 6,690,295 B1 | 2/2004 | De Boer |
| 6,838,791 B2 | 1/2005 | Edelson |
| 6,922,037 B2 | 7/2005 | Edelson |
| 7,445,178 B2 * | 11/2008 | McCoskey et al. ............ 244/50 |
| 2004/0059497 A1 | 3/2004 | Sankrithi |
| 2004/0090348 A1 | 5/2004 | Hutton |
| 2004/0208603 A1 * | 10/2004 | Hekkel et al. ................ 398/140 |
| 2005/0247824 A1 | 11/2005 | Allison |
| 2005/0253020 A1 | 11/2005 | McCoskey et al. |
| 2005/0253021 A1 | 11/2005 | McCoskey et al. |
| 2006/0065779 A1 | 3/2006 | McCoskey et al. |
| 2006/0255555 A1 | 11/2006 | Lindahl |
| 2006/0273686 A1 | 12/2006 | Edelson |

FOREIGN PATENT DOCUMENTS

| | | |
|---|---|---|
| FR | 2628590 A1 | 9/1989 |
| JP | 2002321699 A2 | 11/2002 |
| WO | WO-03/078250 A1 | 9/2003 |
| WO | WO-2005/035358 A2 | 4/2005 |
| WO | WO-2005/112584 A2 | 12/2005 |
| WO | WO-2006/002207 A2 | 1/2006 |
| WO | WO-2006/065988 A2 | 6/2006 |
| WO | WO-2006/113121 A1 | 10/2006 |

* cited by examiner

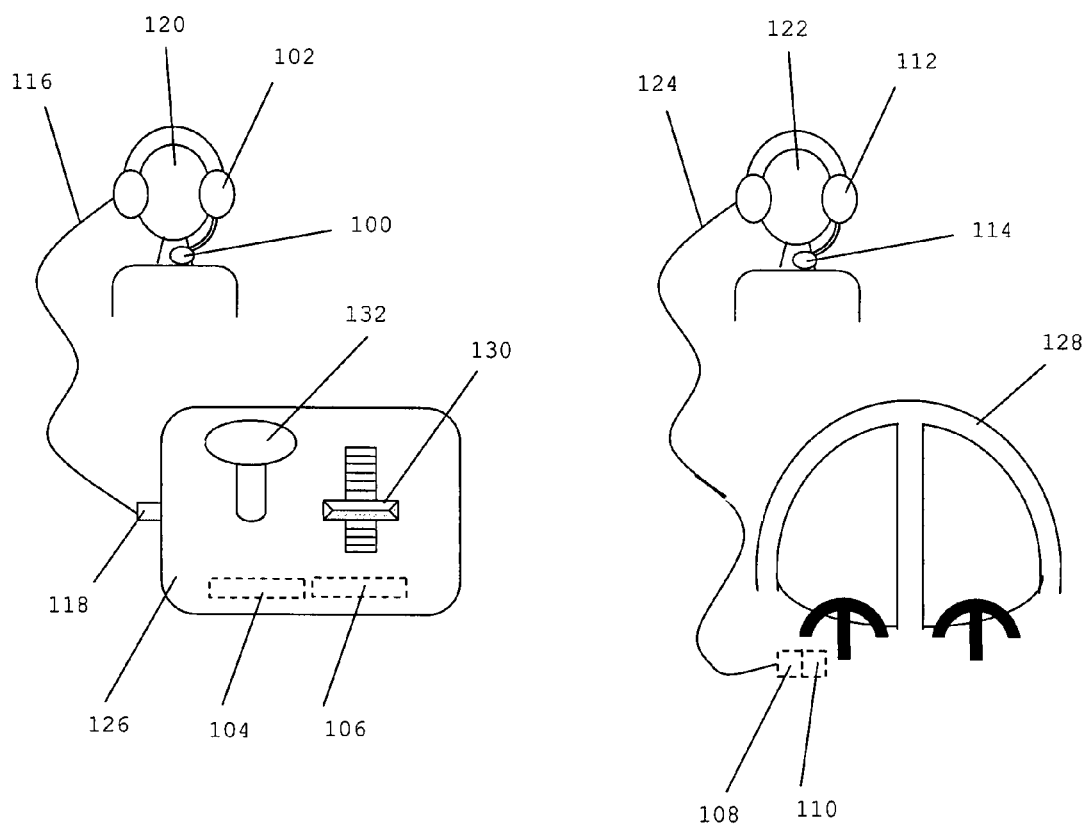

TURNAROUND METHODS

CROSS-REFERENCE TO RELATED APPLICATIONS

This application claims the benefit of G.B. Patent Appl. No. 0616983.3, filed Aug. 29, 2006 and U.S. Patent Appl. No. 60/961,940, filed Jul. 24, 2007, which are assigned to the assignee of the present application and are herein incorporated in their entirety by reference.

BACKGROUND OF THE INVENTION

The present invention relates to methods for reducing airport turnaround times, and more particularly relates to reducing safety margins around aircraft moving on taxiways by eliminating the use of aircraft thrust equipment, such as turbines on the ground and motorized tugs to tow aircraft.

It is standard practice at airports that ground personnel who are close to the aircraft when the turbines are running protect their ears from the noise caused by the turbines using protective earphones, and communicate with each other using hand signals since hearing is not possible. Headsets are required to communicate with pilots, in which background noise from turbines causes further communications problems.

FR 2628590 to Hodys discloses a device intended to carry out sound captures without the useful signal being cluttered with ambient noise, and teaches that the device is particularly intended to allow sound captures in a very noisy environment such as for example communications between airport runway staff.

It is further standard safety practise at airports that ground personnel do not approach the aircraft or bring loading bridges, stairs, luggage carts, conveyor belts, or other equipment necessary for unloading passengers and luggage or cargo, to the aircraft until the aircraft turbines have been turned off and come to rest. Only when the precise parked location of the aircraft is known can loading bridges, stairs, luggage carts, etc. be positioned. This causes delays to turnaround times.

The background section of US2004090348 to Hutton discloses some of the delays associated with loading bridges, for example.

JP2002321699 to FUKUHARA and TAKASU discusses some of the issues associated with cargo and luggage loading and unloading. It discloses a tow vehicle that can tow cargo laden equipment such as container dollies and pallet dollies from the cargo holding area inside of the airport terminal building to aircraft parked on the tarmac to thereby automatically transport the air cargo.

In the above prior art dealing with loading and unloading of equipment from aircraft, it is assumed that either the aircraft will taxi to a parking space using its turbines, in which case no processes can take place until the turbines have been turned off and come to a standstill, or that a motorised tug is used to bring the aircraft to a parking space, in which case additional time is required to attach the tug. Here also, ground personnel cannot approach the aircraft to attach the tug until the turbines have been turned off and come to a standstill.

U.S. Pat. No. 5,078,340 to Anderberg and WO03078250 to Mallet disclose methods of automatically moving aircraft along taxiways and into parking spaces using equipment fixed beneath the ground of the taxiways. This enables the turbines to be turned off before parking, but requires extensive alterations to airport taxiways. Furthermore, the equipment may not fit all present or future aircraft.

US2005247824 to Allison discloses an aircraft having a removable passenger compartment and a removable luggage compartment to speed loading and unloading of passengers and luggage. Passengers and luggage are loaded into said removable compartments in advance of the aircraft arriving at the airport. When the aircraft arrives, the removable compartments containing the arriving passengers and luggage are removed and the removable compartments containing the departing passengers and luggage are attached to the aircraft. The aircraft can then take off, while passengers and luggage are still being unloaded from the arriving removable compartments.

Allison thus solves the problem reducing of loading and unloading times for aircraft but at the great expense of totally renewing or vastly modifying fleets of aircraft.

It can be seen from the above that it would be advantageous to enable loading and unloading equipment to approach an aircraft as soon as possible after an aircraft lands, without a major modification to the aircraft or taxiways.

Motors providing high torque at low speeds are known in the art. Specifically, such motors are known that are designed for the purpose of propelling aircraft on the ground.

In WO05/112584 Edelson discloses a motor-generator machine comprising a slotless AC induction motor. The motor disclosed therein is an AC induction machine comprising an external electrical member attached to a supporting frame and an internal electrical member attached to a supporting core; one or both supports are slotless, and the electrical member attached thereto comprises a number of surface mounted conductor bars separated from one another by suitable insulation. An airgap features between the magnetic portions of core and frame. Electrical members perform the usual functions of rotor and stator but are not limited in position by the present invention to either rôle. The stator comprises at least three different electrical phases supplied with electrical power by an inverter. The rotor has a standard winding configuration, and the rotor support permits axial rotation.

In WO05/112584 Edelson discloses a motor-generator machine comprising a high phase order AC machine with short pitch winding. Disclosed therein is a high phase order alternating current rotating machine having an inverter drive that provides more than three phases of drive waveform of harmonic order H, and characterized in that the windings of the machine have a pitch of less than 180 rotational degrees. Preferably the windings are connected together in a mesh, star or delta connection. The disclosure is further directed to selection of a winding pitch that yields a different chording factor for different harmonics. The aim is to select a chording factor that is optimal for the desired harmonics.

In WO2006/065988 Edelson discloses a motor-generator machine comprising stator coils wound around the inside and outside of a stator, that is, toroidally wound. The machine may be used with a dual rotor combination, so that both the inside and outside of the stator may be active. Even order drive harmonics may be used, if the pitch factor for the windings permits them. In a preferred embodiment, each of the coils is driven by a unique, dedicated drive phase. However, if a number of coils have the same phase angle as one another, and are positioned on the stator in different poles, these may alternatively be connected together to be driven by the same drive phase. In a preferred embodiment, the coils are connected to be able to operate with 2 poles, or four poles, under H=1 where H is the harmonic order of the drive waveform. The coils may be connected together in series, parallel, or anti-parallel.

In 2006/0273686, a motor-generator machine is disclosed comprising a polyphase electric motor which is preferably connected to drive systems via mesh connections to provide variable V/Hz ratios. The motor-generator machine disclosed therein comprises an axle; a hub rotatably mounted on said axle; an electrical induction motor comprising a rotor and a stator; and an inverter electrically connected to said stator; wherein one of said rotor or stator is attached to said hub and the other of said rotor or stator is attached to said axle. Such a machine may be located inside a vehicle drive wheel, and allows a drive motor to provide the necessary torque with reasonable system mass.

In WO2006/113121, a motor-generator machine comprising an induction and switched reluctance motor designed to operate as a reluctance machine at low speeds and an inductance machine at high speeds is disclosed. The motor drive provides more than three different phases and is capable of synthesizing different harmonics. As an example, the motor may be wound with seven different phases, and the drive may be capable of supplying fundamental, third and fifth harmonic. The stator windings are preferably connected with a mesh connection. The system is particularly suitable for a high phase order induction machine drive systems of the type disclosed in U.S. Pat. Nos. 6,657,334 and 6,831,430. The rotor, in combination with the stator, is designed with a particular structure that reacts to a magnetic field configuration generated by one drive waveform harmonic. The reaction to this harmonic by the rotor structure produces a reluctance torque that rotates the rotor. For a different harmonic drive waveform, a different magnetic field configuration is produced, for which the rotor structure defines that substantially negligible reluctance torque is produced. However, this magnetic field configuration induces substantial rotor currents in the rotor windings, and the currents produce induction based torque to rotate the rotor.

U.S. Pat. No. 7,226,018 and U.S. Pat. No. 7,237,748 to Delos Aerospace an aircraft landing gear comprised of a wheel hub motor/generator disks stack, including alternating rotor and stator disks mounted with respect to the wheel support and wheel is disclosed. The invention can provide motive force to the wheel when electrical power is applied, e.g. prior to touch-down. After touchdown the wheel hub motor/generator may be used as a generator thus applying a regenerative braking force and/or a motorized braking action to the wheel. The energy generated upon landing maybe dissipated through a resistor and/or stored for later use in providing a source for motive power to the aircraft wheels for taxiing and ground maneuvers of the aircraft.

In US2006/0065779 a powered nose aircraft wheel system for an aircraft which includes landing gear that extends from the aircraft. A wheel axel is coupled to the landing gear is disclosed. A wheel is coupled to the wheel axel. A wheel motor is coupled to the wheel axel and the wheel. A controller is coupled to the wheel motor and rotates the wheel. A method of taxiing an aircraft includes permitting the wheel of the aircraft to freely spin during the landing of the aircraft. Power is transferred from an auxiliary power unit of the aircraft to the wheel motor. The wheel is rotated via the wheel motor. The aircraft is steered and the speed of the wheel is controlled via one or more controllers selected from an onboard controller and an offboard controller.

BRIEF SUMMARY OF THE INVENTION

It is an object of the present invention to reduce turnaround times of aircraft and increase efficiency at airports by providing turnaround methods which take advantage of the use of electrically self-propelled aircraft in place of thrust equipment, such as turbines, and motorized tugs for moving aircraft on the ground.

Accordingly, a method is provided for reducing the turnaround time of an aircraft, for aircraft having at least one self-propelled undercarriage wheel, comprising the steps of: preparing turnaround equipment, close to a parking space for the aircraft; turning off the aircraft thrust equipment, (e.g. turbines) before arriving at an airport terminal; moving the aircraft to the parking space using self-propelled undercarriage wheels; positioning said turnaround equipment with respect to the aircraft immediately after the aircraft comes to rest; unloading all arriving equipment.

A further method is provided for reducing turnaround times of aircraft and enhancing communications on airport taxiways, for aircraft having at least one self-propelled undercarriage wheel, comprising moving the aircraft using self-propelled undercarriage wheels, whereby ground personnel do not require ear protecting equipment and communication is facilitated between ground personnel.

A yet further method is provided comprising moving the aircraft using self-propelled undercarriage wheels and conducting vocal ground personnel communication via vocal communication apparatus.

BRIEF DESCRIPTION OF THE SEVERAL VIEWS OF THE DRAWING

FIG. 2 shows the vocal communication apparatus of the present invention.

DETAILED DESCRIPTION OF THE INVENTION

Figure 1:
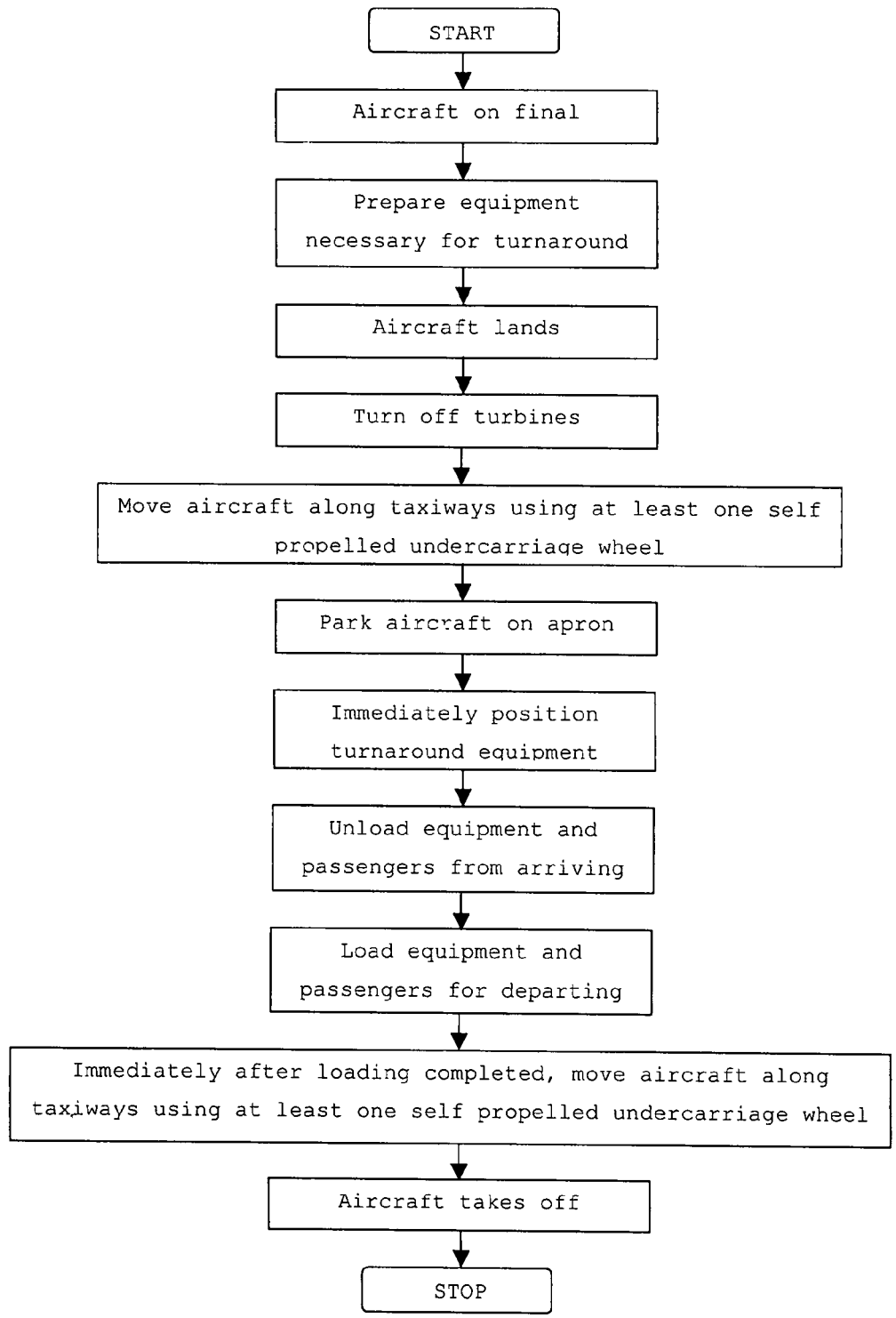
FIG. 1 shows flow chart depicting an example of a method according to the present invention, and should not be considered to be limiting.

In the following, arriving equipment is defined as all persons and objects being unloaded from the aircraft on the aircraft's arrival at the airport. Departing equipment is defined as all persons and objects being loaded onto the aircraft for the aircraft's departure from the airport. Turnaround equipment is defined as all persons and objects which are necessary to facilitate the turnaround process, and which remain at the airport.

In a first embodiment of the invention, a method is disclosed for reducing the turnaround time of an aircraft, for aircraft having at least one self-propelled undercarriage wheel, comprising the steps of: preparing turnaround equipment, close to a parking space for the aircraft; turning off the aircraft thrust equipment, (e.g. turbines) before arriving at an airport terminal; moving the aircraft to the parking space using self-propelled undercarriage wheels; positioning said turnaround equipment with respect to the aircraft immediately after the aircraft comes to rest; unloading all arriving equipment.

Examples of turnaround equipment are loading bridges, stairs, luggage carts, cargo tractors, and conveyor belt loaders, although this is not a limiting or exhaustive list.

Examples of arriving or departing equipment are passengers, luggage, cargo, and litter, although this is not a limiting or exhaustive list.

In this way, unloading and loading of arriving and departing equipment can commence soon after the aircraft parks, and sooner than would be possible if the aircraft parked using its thrust equipment, (e.g. turbines) or a motorized tug.

It should be noted that, although the use of a tug expedites the process between parking and loading/unloading, the tug itself cannot be attached to the aircraft until the thrust equipment, (e.g. turbines) have been turned off and come to rest, due to danger and noise considerations, thus the delay caused by the thrust equipment, (e.g. turbines) still exists.

Said self-propelled undercarriage wheels are preferably propelled using one of the motors described in the background section of this patent, any may be propelled using any mesh-connected, high phase order induction motor located inside the wheel or close to the wheel, or any other induction motor or other drive means.

The invention also includes the reverse process, that consisting of the steps of: loading departing equipment onto an aircraft; removing turnaround equipment; moving the aircraft to the runway immediately after said departing equipment has been loaded and said turnaround equipment has been removed, using at least one self propelled undercarriage wheel; turning on thrust equipment, (e.g. turbines) for take off when the aircraft is in the appropriate position on the runway.

An example of a method according to the above is shown in the flow chart of FIG. 1.

In a second embodiment of the invention, a method for reducing turnaround times of aircraft and enhancing communications on airport taxiways is disclosed, for aircraft having at least one self-propelled undercarriage wheel, comprising moving the aircraft using self-propelled undercarriage wheels, whereby ground personnel do not require ear protecting equipment and communication is facilitated between ground personnel, and between ground personnel and pilots. Hand signals may no longer be required. Ground personnel are thus able to speak to each other normally to communicate, for example, instructions for directing aircraft.

Ground personnel may alternatively use hand signals in conjunction with vocal communication.

A further advantage of this is that ear protection does not need to be worn, which saves time in putting and taking off the ear protection, and increases personal safety of the personnel who can hear their immediate environment.

A further advantage of this invention is that ground personnel are able to use remote voice communication devices, such as described in the third embodiment.

Ground personnel are defined herein as any persons being present on the taxiway of an airport, including those on, but not in, the aircraft. A taxiway is defined herein as being any space at an airport in which an aircraft may move on the ground and includes aprons, runways and maintenance areas.

In a third embodiment of the invention, a method for reducing turnaround times of aircraft and enhancing communications on airport taxiways is disclosed, for aircraft having at least one self-propelled undercarriage wheel, comprising moving the aircraft using self-propelled undercarriage wheels and conducting vocal ground personnel communication via vocal communication apparatus.

Said vocal communication apparatus preferably comprises an external control unit comprising: voice sensing means; transmitting means for transmitting voice information to persons in said aircraft; receiving means for receiving voice information from persons in said aircraft; and amplifying means for enabling said voice information to be heard; and an in-aircraft control unit comprising: voice sensing means; transmitting means for transmitting voice information to persons external to said aircraft; receiving means for receiving voice information from persons external to said aircraft; and amplifying means for enabling said voice information to be heard.

FIG. 2 shows the preferred embodiment of the apparatus in which the further optional features of direction and speed control are present, as will be described. FIG. 2 shows external control unit 126 with person 120 outside said aircraft, who is preferably an airport staff member. External control unit 126 comprises a jack 118 for ground-end wire 116. Wire 116 connects ground-end headphones 102 (the amplifying means of said external control unit) and ground-end microphone (the voice-sensing means of said external control unit) 100 to external control unit 126. Headphones 102 and microphone 100 are worn by airport staff member 120 for communication with persons in said aircraft. External control unit 126 further comprises ground-end transmitting means 104 and ground-end receiving means 106, which may be a combined transmitting and receiving means as will be described later. In the figure shown, external control unit 126 comprises the further optional features of direction control arm 132 and speed control slider 130. Although these are not necessary features of the invention, they are preferred and are therefore pictured here.

FIG. 2 further shows a person 122 in said aircraft, who is preferably the pilot, wearing pilot-end headphones 112 (the amplifying means of said in-aircraft control unit) and pilot-end microphone 114 (the voice-sensing means of said in-aircraft control unit), connected via pilot-end wire 124 to pilot-end transmitting means 108 and pilot-end receiving means 110, which are located in cockpit 128.

Said external control unit is a handheld or fixed console constructed from plastic, metal, or any material suitable for use outside in all weather conditions, in which is located the ground-end equipment for speaking and listening, as well as possibly other controls used by persons outside an aircraft. Preferably, the unit is attached to the ground or mounted on equipment attached to the ground, near a gate at an airport. An advantage of this is that it will always be at a known location. Said control unit may also be attached to any airport gate equipment such as a passenger loading bridge or other portable gate equipment. An advantage of this is that said control unit can be moved to a gate at which it is required. Said control unit may also be attached to a maintenance hanger, a runway, a taxiway, an apron or other location where aircraft need to be moved, or attached to any equipment in such areas. Said control unit may also be handheld. An advantage of this is that the airport staff member can move about freely while wearing said amplification means and voice sensing means. Furthermore, said amplification means and voice sensing means may be wireless (i.e. there is no ground-end wire 116) and may communicate with said external control unit via infrared, Bluetooth, ultrasound, optical, laser, radio, radar or any known wireless communication method. This also has the advantage of the airport staff member being able to move freely, while retaining the advantages mentioned earlier of having a fixed control unit.

Said external control unit may further comprise a voice-sensing means on/off control, and/or an amplification means on/off control, either or both of which may be a push button, switch, lever, or any other means for sending an on or an off signal. Alternatively, there may be a control which switches between voice-sensing means use and amplifying means use, i.e. between speaking and listening, similar to a walkie talkie. Alternatively, there may be a control which switches on/off both amplifying means and voice sensing means concurrently. The external control unit may further comprise an indicator or indicators for showing whether said amplifying means and voice sensing means are on or off. This may be an LED, other light, LCD display or any other known form of indicator.

Said external control unit may further comprise one or more of parking brake control means, APU control means, battery control means, ground-based power control means, direction control means and speed control means.

Said brake control means and said APU control means, if present, may be switches, levers, push buttons, sliders, touch pads, optical sensors, heat sensors, pedals or any other type of control means capable of transmitting an on and an off signal. Said brake control means and said APU control means may be situated on said external control means, on the outside of said aircraft, fixed to gate, maintenance hangar, or other aircraft equipment, or in another location.

Said battery control means, if present, is preferably a switch but may be any other form of control means such as push button, slider, optical sensor, touchpad, heat sensor, etc, for turning on and off said battery. The aircraft may have batteries and said batteries may also be used to move said aircraft over short distances, for example within a hangar. In normal operation, an aircraft being powered by an APU may take power from the batteries when needed, such as in the case of power surges while taxiing, and the battery controlling means does not preclude this possibility. Rather, it is a means for choosing only to take power from the battery for a given operation. An advantage of this is that the APU does not need to be turned on.

Said ground based power control means, if present, is preferably a switch but may be any other form of control means such as push button, slider, optical sensor, touchpad, heat sensor, etc, for turning on and off said ground based power source. The airport may have a ground based power source to which aircraft can connect when at the airport, which may be used to provide power for aircraft functions such as taxiing, lighting, heating, etc. An advantage of this is that it provides an alternative power source to the APU.

Said direction control means and speed control means, if present, may be an arm comparable to a joystick. Said arm may be rigid and able to be pushed to cause the aircraft to decelerate and pulled to cause the aircraft to accelerate. The aircraft will move in a direction determined by the direction in which the arm is moved by the person outside said aircraft holding the arm, at a speed determined by the person outside said aircraft pushing or pulling the arm. Alternatively, said arm is a flexible strap, rope, chain or any other flexible control arm made from any strong, flexible material or a rigid material in a flexible form such as a metal chain. In this variation, speed and direction are determined by the speed and direction respectively in which the airport ground staff member moves said arm. Alternatively, there may be a separate control for speed which may be a slider, dial, two-way switch or any other control means capable of indicating a multiplicity of levels of speed. The arm may only move the aircraft when it is held taut, and a safety feature may cut off communications between the arm and the aircraft when said arm becomes not taut. Alternatively, position sensors at the end of said arm may determine the movements of said arm to control the aircraft, whether said arm is taut or loose. Said arm protrudes from said external control unit and is movably attached to said control unit in a manner similar to a the stick of a joystick from its base, such that said control unit can interpret movements of said arm in order to transmit them to said aircraft nosewheel. Preferably, said control unit can recognize directional movements of said arm in at least two dimensions. An advantage of this is that the movement of the aircraft can be controlled very intuitively by a ground staff member moving the arm in the direction the aircraft is desired to be moved. Alternatively, said control unit can recognize directional movements of said arm in only one dimension. Advantages of this are that the apparatus is less expensive and easier to produce and that there is less information to transmit to said nosewheel. In this variation, left and right movements could be controlled via said arm, while forward/reverse motion of the aircraft is controlled by a separate control or by a distinct movement of said arm, for example pushing or pulling said arm.

Said external control unit may further comprise control means for controlling any other aircraft function, for example but without limitation, aileron movement, windscreen wiper operation, fuel tank opening, door opening, emergency stop, fire suppression, etc. Such functions may be useful for maintenance, repair, emergency or other situations.

Said external control unit may further comprise a security cover for preventing unauthorized use, which covers some or all of the control means on said external control means (which may include microphone, headphone, speed control, direction control APU control, brake control or any other controls present) or restricts their movement, whereby said control means cannot be accessed or operated without a physical key, electronic key, number code, letter code, fingerprint recognition, iris recognition, barcode recognition, or any other known means for unlocking a cover.

Said external control unit may comprise a transmittal-restricting safety feature whereby operations of one or both of said control means are not transmitted to said nosewheel unless said transmittal-restricting safety feature has been disabled. Said feature may be disabled using a physical key, electronic key, number code, letter code, fingerprint recognition, iris recognition, barcode recognition or any other known means of safety feature disabling.

Said in-aircraft control unit, comprising voice sensing means, transmitting means, receiving means and amplifying means, is preferably built into the cockpit in the control/display area but may be a stand alone unit to be placed in said cockpit or elsewhere in said aircraft, or may be built into another section of said aircraft, for example, the kitchen if it will be used to communicate with food loading staff, etc. Existing aircraft transmitting and receiving means, located in the aircraft cockpit or elsewhere, may be adapted to transmit and receive the voice signals of the present invention in place of said transmitting and receiving means.

Said pilot-end and ground-end transmitting means may be any known form of transmitter, transponder, transceiver or other information communicating means. Preferably said information is transmitted wirelessly between persons outside said aircraft and those inside, for example via infrared, optical, laser, Bluetooth, radio, radar or any other known wireless information transmittal means. An advantage of this is that no wire has to be attached, detached or stored. Alternatively said information is transmitted using electric cables, optical cables, or any other known form of wire. A wire may be detachable at one or both ends, that is, the aircraft end and the external control unit end. An advantage of this is that a reliable connection is always maintained.

Said pilot-end and ground-end receiving means may be a direct conversion receiver or any known form of receiver, transponder, transceiver or other known form of information receiving means.

Said pilot-end transmitting means and said pilot-end receiving means may be combined in a single unit. Said ground-end transmitting means and said ground-end receiving means may be combined in a single unit.

Said ground-end amplifying means are preferably headphones and are more preferably over-ear headphones as shown in FIG. 2, which may include noise canceling technology, sound isolation, and any or all technology known in the art for enhancing headphone sound quality. An advantage of this is that voice communication from said headphones can be easily heard and unnecessary background noise can be very effectively removed. A further advantage is that, since airport ground staff commonly wear headphones for the purposes of ear protection, the wearing of headphones will be familiar and the procedural change small. Said headphones may have a feature whereby the user can alternate between isolating and hearing outside sound. Said ground-end amplifying means may alternatively be in-ear headphones or earplugs, or may be hookable headphones which hook onto or around the ear in the manner of a Bluetooth headset for a mobile phone, or may attach to the ear in any other way. Such smaller earpieces or headphones are a possibility around quieter self-propelled aircraft which taxi without thrust equipment, (e.g. turbines), where ear protection is not needed. An advantage of smaller earpieces or headphones is that they are lighter and easier to wear. A further advantage is that they allow sounds to be heard from the direct environment of the persons outside the aircraft using the headphones, which facilitates communication and personal safety. There may be two earpieces, one for each ear, or there may be one earpiece for attachment to one ear only. As a further alternative, said ground-end amplifying means may be a loudspeaker in or close to said external control unit, such that voice communication from said loudspeaker can be heard a small distance from said external control unit. An advantage of this is that no headphones have to be worn, so that the person outside the aircraft has more freedom of movement and can hear sounds in their direct environment, increasing personal safety and ease of communication with other persons outside said aircraft. Said ground-end amplifying means may be connected via a wire to the external control unit as shown in FIG. 2 or may be wireless, using Bluetooth, infrared, ultrasound, radio, laser, or any other wireless technology.

Said pilot-end amplifying means are preferably headphones and are more preferably over-ear headphones as shown in FIG. 2, and may include noise canceling technology, sound isolation, and any or all technology known in the art for enhancing headphone sound quality. An advantage of this is that voice communication from said headphones can be easily heard and unnecessary background noise can be very effectively removed. A further advantage is that, since pilots commonly wear headphones, the wearing of headphones will be familiar and the procedural change small. Said headphones may in fact be the regular cockpit headphones, configured to receive voice signals from said pilot-end receiving means as well as all the signals usually received by existing cockpit headphones. Said headphones may have a feature whereby the user can alternate between isolating and hearing outside sound, and/or between hearing sound from ground staff and other sources. Said pilot-end amplifying means may alternatively be in-ear headphones or earplugs, or may hook onto or around the ear in the manner of a Bluetooth headset for a mobile phone, or may attach to the ear in any other way. Such smaller earpieces or headphones are a possibility in aircraft where headphones are not otherwise worn. An advantage of smaller earpieces or headphones is that they are lighter and easier to wear. A further advantage is that they allow sounds to be heard from the direct environment of the user, which facilitates communication and personal safety. There may be two earpieces, one for each ear, or there may be one earpiece for attachment to one ear only. As a further alternative, said pilot-end amplifying means may be a loudspeaker in said cockpit, such that voice communication from said loudspeaker can be heard in said cockpit. An advantage of this is that no headphones have to be worn, so that the user has more freedom of movement and can hear sounds in their direct environment, increasing personal safety and ease of communication with other persons outside said aircraft. Said pilot-end amplifying means may be connected via a wire to the cockpit as shown in FIG. 2 or may be wireless, using Bluetooth, infrared, ultrasound, radio, laser, or any other wireless technology.

Said ground- and pilot-end amplifying means may also be any other known form of amplifying means.

Said ground-end voice-sensing means is preferably a microphone which preferably extends from said ground-end headphones as shown in FIG. 2, but may also hang from an earpiece which hooks onto or sits inside an ear, or may clip onto the user's clothes, or may be embedded in or close to said external control unit, or be shaped and located in any other way. Said ground-end voice-sensing means may also be any other means for sensing and enabling the transmission of a voice signal.

Said pilot-end voice-sensing means is preferably a microphone which preferably extends from said pilot-end headphones as shown in FIG. 2, but may also hang from an earpiece which hooks onto or sits inside an ear, or may clip onto the user's clothes, or may be embedded in or close to the controls area of said cockpit, or be shaped and located in any other way. Said pilot-end voice-sensing means may also be any other means for sensing and enabling the transmission of a voice signal.

Said person inside said aircraft is preferably the pilot but may also be other members of aircraft crew such as a co-pilot, air hostesses, passengers, cleaning staff.

Said person outside said aircraft is preferably a member of airport ground staff responsible for supervising the parking of the aircraft, but may also be ground staff responsible for fuel loading, passenger loading, baggage loading, cargo loading, fuel loading, cleaning, maintenance, repair, or any other ground function, or may be air traffic controllers, any other airport staff, emergency medical staff, passengers' acquaintances or business contacts, or persons needing or desiring to communicate with said aircraft.

Thus, the invention disclosed herein provides methods for reducing turnaround times and increasing efficiency at airports, without the need for large-scale modifications to either aircraft or airports. Further advantages of the invention may also be apparent, such as reduced atmospheric pollution, ability of aircraft to be driven backwards, etc.

The invention claimed is:

1. A landing system for reducing a turnaround event time of an aircraft at an airport, comprising:
 (a) an aircraft having thrust equipment for flight and at least one undercarriage wheel;
 (b) arriving, departing, and turnaround equipment at said airport; and
 (c) means for controlling the movements of said aircraft;
 (d) an external control unit comprising:
  (i) control means for inputting the required speed and/or direction of said nosewheel;
  (ii) means for transmitting speed and/or direction information to said self-propelled nosewheel; the apparatus further comprising:
  (iii) means for receiving speed and/or direction information at said self-propelled nosewheel; and
  (iv) means for controlling the speed and/or direction of said nosewheel;
 said system characterized by said undercarriage wheel being self-propelled and able to move said aircraft without the use of said thrust equipment, said system further characterized by said arriving, departing and turnaround equipment positioned in close proximity to said aircraft prior to said turnaround event without risk of damage.

2. The landing system of claim 1 wherein said turnaround equipment is one or more selected from the list comprising: loading bridges, stairs, luggage carts, cargo tractors, and conveyor belt loaders.

3. The landing system of claim 1 wherein said arriving equipment is one or more selected from the list comprising: passengers, luggage, cargo, and litter.

4. The landing system of claim 1 wherein said departing equipment is one or more selected from the list comprising passengers, cargo, and food.

5. The landing system of claim 1 wherein said at least one self-propelled wheel is driven using a high phase order induction motor.

6. The landing system of claim 1 for enhancing communications on airport taxiways additionally comprising ground personnel, characterized by said personnel not having ear protecting equipment and further characterized by facilitated communication between ground personnel.

7. The landing system of claim 1 for facilitating voice communication between persons outside an aircraft on taxiways and persons inside an aircraft, additionally comprising:
  (i) an in-aircraft control unit comprising:
  (a) voice sensing means;
  (b) transmitting means for transmitting voice information to persons external to said aircraft;
  (c) receiving means for receiving voice information from persons external to said aircraft; and
  (d) amplifying means for enabling said voice information to be heard.

8. The apparatus of claim 7 wherein said aircraft has a battery and said external control unit further comprises:
  (a) control means for turning on and off a connection to said battery; and
  (b) transmitting means for transmitting information to said battery; the apparatus further comprising:
  (c) receiving means for receiving information at said battery.

9. The apparatus of claim 7 wherein said airport has a ground based power source and said external control unit further comprises:
  (a) control means for turning on and off a connection to said ground based power source; and
  (b) transmitting means for transmitting information to said ground based power source; the apparatus further comprising:
  (c) receiving means for receiving information at said ground based power source.

10. The apparatus of claim 7 wherein said aircraft has parking brakes and said external control unit further comprises:
  (a) control means for applying and releasing the parking brakes of said aircraft; and
  (b) transmitting means for transmitting information to the parking brakes of said aircraft; the apparatus further comprising:
  (c) receiving means for receiving information at the parking brakes of said aircraft.

11. A method for reducing the turnaround time of an aircraft having the landing system of claim 1 comprising the steps of:
  (a) turning off said thrust equipment after landing;
  (b) moving the aircraft to a required location for turnaround;
  (c) turning on said thrust equipment prior to takeoff;
  characterized by moving said aircraft using at least one self-propelled undercarriage wheel and further characterized by reducing risk from damage to departing equipment, arriving equipment, and turnaround equipment from said thrust equipment.

12. The method of claim 11 wherein said required location is an airport terminal parking space and said thrust equipment is turned off immediately after landing.

13. The method of claim 11 wherein said required location is an airport runway and said thrust equipment is turned on when the aircraft is positioned for takeoff.

14. The method of claim 11 comprising the additional step, before landing of said aircraft, of preparing turnaround equipment close to a parking space for the aircraft.

15. The method of claim 11 comprising the additional step, immediately after the aircraft comes to rest, of positioning turnaround equipment with respect to the aircraft.

16. The method of claim 11 comprising the additional step, after the aircraft comes to rest, of unloading all arriving equipment.

17. The method of claim 11 comprising the additional step, before an aircraft leaves a gate, of loading departing equipment onto said aircraft.

18. The method of claim 11 comprising the additional step, before an airport leaves a gate, of removing turnaround equipment from proximity to the aircraft.

19. The method of claim 11 wherein said aircraft is moved to said runway using at least one self-propelled undercarriage wheel, immediately after departing equipment has been loaded and/or turnaround equipment has been removed.

20. The method of claim 11 for enhancing communications on airport taxiways additionally comprising ground personnel, characterized by said personnel not having ear-protecting equipment and further characterized by facilitated communication between said personnel.

21. The landing system of claim 1 for facilitating voice communication between persons outside an aircraft on taxiways and persons inside an aircraft, said external control unit additionally comprising:
  (a) voice sensing means;
  (b) transmitting means for transmitting voice information to persons in said aircraft;
  (c) receiving means for receiving voice information from persons in said aircraft; and
  (d) amplifying means for enabling said voice information to be heard.

* * * * *